UNITED STATES PATENT OFFICE.

ROLAND B. RESPESS, OF NEW YORK, N. Y., ASSIGNOR, BY MESNE ASSIGNMENTS, TO RESPRO INC., OF CRANSTON, RHODE ISLAND, A CORPORATION OF RHODE ISLAND.

PROCESS OF MAKING A LEATHER SUBSTITUTE.

1,411,376.  Specification of Letters Patent.  Patented Apr. 4, 1922.

No Drawing.  Application filed March 31, 1920.  Serial No. 370,139.

*To all whom it may concern:*

Be it known that I, ROLAND B. RESPESS, citizen of the United States, and resident of the borough of Manhattan, city of New York, in the county of New York and State of New York, have invented certain new and useful Improvements in Processes of Making a Leather Substitute, of which the following is a specification.

This invention relates to the process of making a leather substitute.

The organization of my invention comprises the production of a leather substitute made in rolls, preferably of fifty yards and upwards in length and any desired width, from cotton or other fibers spun into threads or cords which are thereafter woven into sheet rolls in the usual manner. The sheet is passed through a napping machine to pull a part of the twisted fibers from the woven threads to form a loose fiber surface on each side of the woven sheet, with a part of each loose fiber attached to the twisted threads of the sheet. The napped sheet is treated with a saturating adhesive agent, such as a rubber compound or cellulose. It is then dried and pressed under tension and finished on one or both sides with a surface dressing, to form a fabric resembling leather, which may be embossed if desired in any design as leather is embossed.

In general terms the leather substitute is made by taking suitable woven fabric and passing it through a napping machine to pull a part of the twisted fibres in the threads or cords composing the fabric, to form a fibrous surface on each side of the woven fabric, winding the prepared fabric in a machine upon a core to form a tightly wound roll. The rolls of fabric are placed in a machine similar to a doubling or facing machine having two pressure rolls which travel at the same speed. The fabric is then saturated with an adhesive agent as it is unwound under tension. The saturated adhesive is then pressed into the fabric between pressure rollers after which it passes to a drying chamber and the solvent in the adhesive agent is evaporated. The fabric is next subjected to tension and again passed between rollers and pressed, when for some purposes the fabric is ready for use. This process may be repeated to introduce an additional quantity of adhesive agent if desired.

I prefer to use a rubber compound containing a vulcanizing agent as the saturating adhesive agent, but any other suitable adhesive agent may be used. When a rubber compound is used the next step would be to vulcanize the sheet to set the rubber after which the sheet may be again passed between pressure rolls if desired. In the use of other adhesive saturating agents the treatment may be varied in accordance with the mixture used, as in the use of boiled oils it may be saturated one or more times and each saturation may require the fabric to be subjected to heat for several hours to dry out the oils to the condition desired. In the use of cellulose compounds containing oils the mixture may dry very rapidly and require passing only over heated pipes or through a drying chamber, or in the use of a gelatin mixture a treatment to make it non-soluble in water may be required. It is also possible to treat the fabric with acids or other dissolving agents to partially dissolve the fibers, and by additional treatment cause the fibers to firmly adhere to each other by the adhesive element obtained thereby. In the latter case the cellulose of the fibers in the woven fabric supplies the adhesive element.

The next step if desired is to coat the prepared fabric with a dressing, though for some purposes the undressed fabric may be used as undressed leather is used in the arts, in which case this final step of coating with a dressing is omitted. The surface dressing may be placed on the fabric in the same manner as now used in finishing split leather, by hand or as artificial leather is finished by depositing one or more coats of the dressing on the fabric by passing it under a knife on a coating machine, or the fabric may be coated with a film of rubber by passing it between the rolls of a rubber calender. Any required embossing design may be impressed on the coated fabric by a plate or roller embossing press.

The treatment will produce a fabric which is compact like leather and which has a matted fiber or felted surface under the dressing and on the undressed side, if one side only is finished, with the fibrous surface firmly attached to the part of the twisted threads which originally composed the woven fabric, before a part of the fibers were pulled out by the napping machine. This fabric may have relatively greater strength than the original woven fabric. The threads are held firmly in their original position and do not work against each other when used, and thereby separate from or strain the surface dressing as now occurs in artificial leather where the dressing is only a surface coating for the woven cloth.

In the production of this leather substitute in some cases one adhesive agent for the treatment of the fabric may be used and another adhesive element for the surface dressing, or the same agent may be used throughout. When two adhesive elements are employed it is preferable to press the surface dressing into the fabric between pressure rolls when the first one or two coats are put on, after which additional coats may be put on in the usual manner by hand or by a knife coating machine.

Having described my invention what I desire to secure by Letters Patent and claim is:

1. The herein described process of making a leather substitute consisting in treating a woven fabric in a napping machine to produce a loose fiber surface on the fabric, saturating the fabric with a binding agent, subjecting to pressure, drying the sheet and pressing under tension.

2. The herein described process of making a leather substitute consisting in treating a woven fabric in a napping machine to produce a loose fiber surface on the fabric, saturating the fabric with a binding agent, subjecting to pressure, drying the sheet, pressing under tension and coating the product with a surface dressing.

Signed at borough of Manhattan, city of New York, in the county of New York and State of New York, this 18th day of March, A. D. 1920.

ROLAND B. RESPESS.